United States Patent [19]

Najvar et al.

[11] 3,996,307

[45] Dec. 7, 1976

[54] VINYL ESTER RESINS WITH IMPROVED SOLUBILITY IN STYRENE

[75] Inventors: Daniel J. Najvar; Jerry M. Hawkins, both of Lake Jackson, Tex.

[73] Assignee: The Dow Chemical Company, Midland, Mich.

[22] Filed: May 9, 1975

[21] Appl. No.: 576,072

[52] U.S. Cl. .............................. 260/837 R; 260/836
[51] Int. Cl.² ......................................... C08L 63/02
[58] Field of Search ....................... 260/836, 837 R

[56] References Cited

UNITED STATES PATENTS

| | | | |
|---|---|---|---|
| 3,342,896 | 9/1967 | Zimmerman et al. | 260/837 R |
| 3,408,422 | 10/1968 | May | 260/837 R |

*Primary Examiner*—Harry Wong, Jr.
*Attorney, Agent, or Firm*—Albin R. Lindstrom

[57] ABSTRACT

The improvement is obtained by converting at least about ten percent of the aliphatic hydroxyl groups present in the vinyl ester resin to ketal groups by reacting the hydroxyl group with an isopropenyl alkyl ether.

7 Claims, No Drawings

VINYL ESTER RESINS WITH IMPROVED SOLUBILITY IN STYRENE

BACKGROUND OF THE INVENTION

Vinyl ester resins which are normally prepared by reacting about equivalent amounts of an unsaturated monocarboxylic acid with a polyepoxide contain aliphatic hydroxyl groups as a result of the resin forming reaction between the carboxyl and epoxide groups. These resins have many valuable uses, particularly when combined with other copolymerizable monomers. For many uses such as glass fiber reinforced pipes, vessels, laminates and the like, styrene and like aromatic monomers are greatly preferred. While the resins are compatible with such monomers as styrene they form cloudy solutions at high monomer concentrations. This invention extends the solubility or compatibility of vinyl ester resins to such concentration ranges.

To reduce the viscosity of solutions of high molecular weight, usually solid resins in inert solvents, U.S. Pat. No. 3,804,795, converts hydroxyl groups in the resin to acetal and ketal groups by a similar reaction. Vinyl ester resins are generally low molecular weight, usually liquid, resins. However, the improved solubility of the modified resins of this invention in styrene and like monomers is an unexpected and beneficial advantage.

THE INVENTION

The improved solubility of the modified vinyl ester resins is obtained by converting at least about 10 percent up to all the aliphatic hydroxyl groups of the resin to ketal groups having the formula

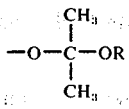

where R is an alkyl or cycloalkyl group of 1 to about 6 carbons. The conversion is obtained by reacting the hydroxyl group with an isopropenyl alkyl ether in the presence of an acid catalyst.

DESCRIPTION

Resins which are herein called vinyl ester resins are well known in the art. They are generally prepared by reacting about equivalent amounts of an unsaturated monocarboxylic acid with a polyepoxide having more than one 1,2-epoxide group per molecule. U.S. Pat. Nos. 3,179,623; 3,367,992; 3,374,893; 3,256,226; 3,301,743 and 3,377,406 are incorporated herein by reference for the purpose of describing the state of the art with respect to reaction conditions, catalysts, reactants and the like which may be employed to prepare the resins.

Preferred acid reactants include acrylic acid, methacrylic acid and hydroxyalkyl acrylate or methacrylate half esters of dicarboxylic acids as disclosed in U.S. Pat. No. 3,367,992. Preferred polyepoxides are epoxy novolacs and polyglycidyl ethers of other polyhydric phenols and of polyhydric alcohols having epoxide equivalent weights of about 170 up to about 600 to 1000.

Characteristically, the vinyl ester resins have terminal, vinyl polymerizable groups connected to the residue of the polyepoxide by a hydroxyl containing linkage group of the formula

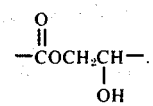

This linkage group results from the reaction between a carboxyl, —COOH, group and an epoxide group. Additional hydroxyl groups may also be present whenever certain higher molecular weight polyepoxide resins are employed in preparing the vinyl ester resin. For example, a diglycidyl ether of bisphenol A may be reacted with small amounts of bisphenol A to produce a higher molecular weight polyepoxide but in so doing —OCH$_2$CH(OH)CH$_2$— groups are formed. A vinyl ester resin subsequently prepared from the latter polyepoxide contains aliphatic hydroxyl groups from both of the above-described groups.

This invention concerns converting at least about 10 percent up to all of the total aliphatic hydroxyl groups in the vinyl ester resin to ketal groups by reaction with an isopropenyl alkyl ether. Said ethers have the formula

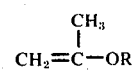

where R is an alkyl or cycloalkyl group of 1 to about 6 carbons. For example R may be methyl, ethyl, isopropyl, n-butyl, cyclohexyl and the like. Preferably at least about 30 percent of the hydroxyl groups are converted to ketal groups.

The reaction between a hydroxyl group and an isopropenyl alkyl ether is highly exothermic, fast and readily goes to completion without excess amounts of said ether. Sufficient cooling should be provided to moderate this exothermic reaction and control the temperature to no more than about 100° C, preferably less. By incremental additions of the ether to the reaction vessel the temperature can be readily controlled to about 40° to 50° C. High temperatures should be avoided since gelation and cure of the resin in the reaction vessel might occur. Stoichiometric amounts of the isopropenyl alkyl ether per hydroxyl group are satisfactory although excess amounts of the ether may be used. Excess ether can be readily flashed off.

The above reaction produces vinyl ester resins having pendant ketal groups of the formula

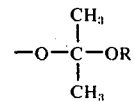

where R is as previously defined.

The reaction is catalyzed by acids, for example, hydrochloric acid, sulfuric acid, boron trifluoride, p-toluene sulfonic acid, hydrogen form cation exchange resins and the like. Small amounts of catalysts are effective, usually from about 0.05 to 3 percent by weight. Preferably the amount of catalyst is about 0.1 to 1 percent and preferably the minimum amount necessary is employed. Residual acid catalyst remaining after the reaction is completed may be removed by means of an anion or weakly basic ion exchange resin. Generally, the properties of the resin are improved by removing the residual catalyst or neutralizing it.

To illustrate the improved compatibility of the ketal modified vinyl ester resins with styrene, a series of modified resins were prepared in which the percent of hydroxyl converted to ketal was varied from 10 to 75 percent.

A vinyl ester resin for these tests was made by reacting about equivalent amounts of methacrylic acid and a bisphenol A based polyepoxide having an epoxide equivalent weight of about 600. Separate portions of this resin were reacted with varying amounts of methyl isopropenyl ether to convert 10, 30, 50 and 75 percent of the hydroxyl groups to methyl ketal groups. Each of the modified resins was diluted with 30 percent by weight styrene. Then 100 gm portions of each resin were titrated with styrene until a detectable turbidity (haziness) was reached. The results of these titrations are recorded below.

| %Hydroxyl as Ketal | Weight Percent Styrene Concentration at Point of Turbidity |
|---|---|
| 0% | 50%* |
| 10 | 57 |
| 30 | 75 |
| 50 | 92 |
| 75 | 99 |

*Value extrapolated from graph of results.

The results clearly show that much higher proportions of styrene are compatible with the vinyl ester resin as the percent of ketal groups increases. With no ketal modification the base resin is limited to about a maximum of 50 percent styrene before haziness occurs. In many applications compatible mixtures with higher amounts of styrene are desirable.

The reduction in viscosity of this resin at a 50 percent styrene level was also measured as the percent of ketal was increased. At 10 percent ketal conversion the viscosity was about 370 cps; at 30 percent ketal about 285 cps and at 50 percent ketal about 140 cps. At 30 percent styrene and 50 percent ketal the resin viscosity was about 7,000 cps.

The 30 percent and 50 percent ketal modified resins containing about 50 wt. % styrene were cured at 80° C for about 16 hours plus 45 min. at 250° F employing 1% benzoyl peroxide as a catalyst. The physical properties were determined with the following results.

|  | 30% Ketal | 50% Ketal |
|---|---|---|
| Flex, psi | 15,721 | 15,069 |
| Flex modulus, psi | 4.45 × 10⁵ | 4.3 × 10⁵ |
| (After 2 hr. water boil) |  |  |
| Flex, psi | 12,804 | 11,129 |
| Flex modulus, psi | 3.75 × 10⁵ | 3.45 × 10⁵ |
| Tensile, psi | 9,667 | 8,887 |
| Elongation, % | 9.5 | 10.5 |
| Heat Distortion temp. | 164° F | 153° F |

Similar results to the above are obtained if acrylic acid is used in place of methacrylic acid or if other polyepoxides or polyepoxide mixtures are used. For example epoxy novolacs alone or in combination with polyglycidyl ethers of bisphenol A based polyepoxides may be used.

What is claimed is:

1. A vinyl ester resin having improved solubility in styrene comprising the reaction product of about equivalent amounts of an unsaturated monocarboxylic acid and a polyepoxide having more than one 1,2-epoxide group per molecule wherein said resin is further reacted with an isopropenyl alkyl ether to convert at least about 10 percent of the aliphatic hydroxyl groups to pendant ketal groups of the formula

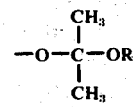

where R is an alkyl or cycloalkyl group of 1 to about 6 carbon atoms.

2. The resin of claim 1 wherein at least about 30 percent of the aliphatic hydroxyls are converted to said ketal groups.

3. The resin of claim 1 wherein about 100 percent of the aliphatic hydroxyls are converted to said ketal groups.

4. The resin of claim 1 wherein said acid is acrylic or methacrylic acid.

5. The resin of claim 4 wherein said polyepoxide is bisphenol A based polyglycidyl ether having an epoxide equivalent weight of about 175 to 600.

6. The resin of claim 4 wherein said polyepoxide is a mixture of an epoxy novolac and a bisphenol A based polyglycidyl ether.

7. The resin of claim 1 wherein said ether is methyl isopropenyl ether and R, correspondingly, is methyl.

* * * * *